May 4, 1948.  E. A. GREEN  2,440,944

NUT

Filed Sept. 3, 1943

INVENTOR.
EDWARD A. GREEN
BY
Kwis Hudson Boughton & Williams
ATTORNEYS

Patented May 4, 1948

2,440,944

UNITED STATES PATENT OFFICE 2,440,944

NUT

Edward A. Green, Chicago, Ill., assignor to Security Machine Products Company, Chicago, Ill., a corporation of Delaware Application September 3, 1943, Serial No. 501,168

5 Claims. (Cl. 151—21)

This invention relates to a nut and more particularly to a combined holding and locking nut which is an improvement on the nut shown and described in my Patent No. 2,125,276, issued August 2, 1938.

In my said Patent No. 2,125,276 the nut is made from a bar having radial slots extending inwardly from its periphery to a circular tubular body containing the threads. The radial slots impart to the body and the threads therein high diametral resilience. The nut is distorted to have a minimum thread pitch diameter substantially less than the thread pitch diameter of the minimum standard bolt to which the nut will be applied, wherefore, the nut will have uniform frictional engagement with the threads of bolts when applied thereto, even though the threads are of varying pitch diameters provided they are manufactured within the tolerances established for commercial bolts. In other words, the nut disclosed in my said Patent No. 2,125,276 is in the form of a tubular internally threaded member of such constant transverse section as to have a high but constant diametral resilience from the bearing surface of the nut to its crown surface, that is, its resistance to radial expansion is uniform from end to end of the nut. The nut in my said patent is produced from special drawn shapes which are expensive to manufacture.

An object of the present invention is to provide a combined holding and locking nut so constructed that its resistance to radial expansion under bolt action at any transverse section of the nut is proportional to the bolt load, at normal loading, which any such transverse section of the nut is to bear.

Another object is to provide a combined holding and locking nut so constructed and having its material so distributed that the nut will have its strength increased at the proper locations to adequately assume the load and resist bolt stress, thus improving its holding nut qualities while at other locations its diametral resilience is increased to improve its lock nut characteristics.

A further object is to provide combined holding and locking nuts that can be produced by simple, inexpensive and efficient manufacturing operations, automatically if desired, from standard tapped nut blanks, as distinguished from producing the nuts more expensively from special drawn shapes.

Further and additional objects and advantages of the invention not hereinbefore expressly stated will become evident during the following detailed description of an embodiment of the invention.

Referring to the accompanying drawings.

Figure 8:
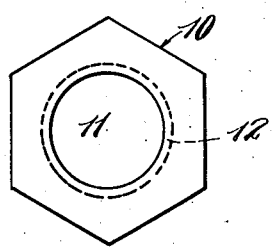
Fig. 8 is a plan view of a standard tapped nut blank.

In Fig. 8 there is shown a standard tapped nut blank 10 which has a bore 11 therethrough that is cylindrical from the bearing face of the nut to the crown face thereof. This standard nut blank has its bore provided with screw threads as indicated by dotted line 12. The wall thickness of the body of this standard nut is uniform for any transverse section of the nut and hence the nut has uniform strength for resisting bolt stresses and uniform diametral resilience from its bearing face to its crown face.

Laboratory tests have established that in a standard nut the first thread (one complete thread convolution) beyond its bearing face receives the greatest portion of the bolt stress or load and that each succeeding thread of the nut toward its crown face bears a successively reduced portion of the load. These tests have further shown that beyond a threaded length ranging between six-tenths (0.6) and eight-tenths (0.8) of the bolt diameter the remaining threads of a standard nut assume little or no load. Therefore, nuts need not be more in height (threaded length) than eighty percent (80%) of their bolt diameter, although in actual practice standard nuts usually have a height equal to their bolt diameter, in order to provide adequate wrenching surfaces. With these facts in mind the construction of the nut embodying the present invention will now be explained.

The nut shown in my Patent 2,125,276 has uniform diametral resilience from end to end of the nut. It has been determined that if the diametral resilience of the patented nut be diminished from its crown face toward its bearing face, the nut would still have ample locking effect when applied to a bolt. In addition, the nut with said variable diametral resilience when partially applied to a bolt would receive the load stresses in the reverse order to that in which they are assumed in a standard nut. That is, the threads adjacent to the crown face of the nut will assume a greater proportion of the load up to approximately sixty percent (60%) of the normal load than will the threads adjacent to the bearing face of the nut. However, when the nut has received sixty percent (60%) of the normal load all of the nut threads assume the load equally. During the assumption of the remaining forty percent (40%) of the normal load the nut will act similarly to a standard nut, in that, the threads adjacent the bearing face of the nut will receive the greater proportion of this remaining part of the load.

The present invention envisions a nut which will have for lock nut purposes a gradually diminishing diametral resilience from its crown face toward its bearing face while for holding nut purposes the radial strength of the nut will diminish from its bearing face toward its crown face in proportion to the load assumed by the threads of the nut when normally loaded. In attaining these features it is proposed to increase the wall thickness and radial strength of the nut toward the bearing face thereof to reinforce the thread convolutions in proportion to the loads they will bear. The terms "crown face" and "bearing face" used in the description and claims refer, respectively, to that face of the nut which is adjacent to the free end of the bolt to which the nut is applied and to that face of the nut which is adjacent to or in contact with one of the parts secured together by the nut and the bolt.

Referring to Figs. 1 to 5 inclusive it will be seen that the standard hexagonal nut blank has been modified by forming therein slots 13 extending from the crown face 14 of the nut to the bearing face 15 thereof. The number of slots 13 formed in each side of the nut may be varied as desired under different conditions but for purposes of illustration, two slots 13 are shown in each side of the nut. The slots 13 of each pair of slots extend in the direction of their depth parallel to a radial line located intermediate the slots of each pair of slots (note section lines 4—4 and 5—5 of Fig. 1). The slots 13 diminish in depth from the crown face 14 of the nut toward the bearing face 15 thereof and such diminution in depth is in relation to the load to be assumed by the threads when the nut is normally loaded. That is, the slots 13 are of less depth where the load is greatest. The slots 13 impart to the nut varying wall thicknesses and radial strength from the bearing face to the crown face of the nut and such variation is in direct proportion to the loads assumed by the nut threads when the nut is normally loaded. In other words, the wall thickness of the nut at any transverse section is related to the load requirements of such section, while those portions of the nut having the least load requirements are of high diametral resilience for lock nut purposes.

The slots 13 may be cut in the nut blanks in any suitable way and if desired could extend radially of the nut, although for manufacturing purposes it is preferred to have the slots arranged as shown in the drawing and described above.

Figure 1:
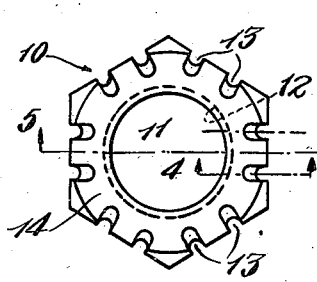
Fig. 1 is a plan view of a combined holding and locking nut embodying the features of the present invention and is taken looking at the crown face of the nut.
Figure 2:
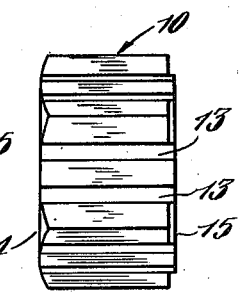
Fig. 2 is a side elevational view of the nut shown in Fig. 1.
Figure 3:
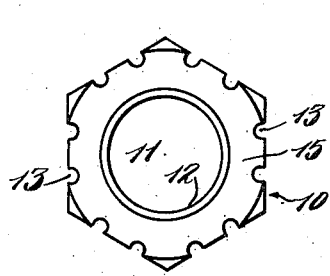
Fig. 3 is a plan view of said nut taken looking at the bearing face of the nut.
Figure 4:
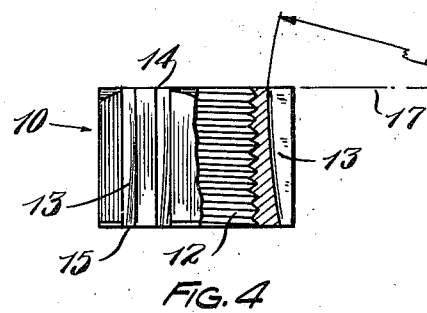
Fig. 4 is a partial elevational and sectional view of the nut with the sectional portion taken on line 4—4 of Fig. 1, looking in the direction of the arrows.
Figure 5:
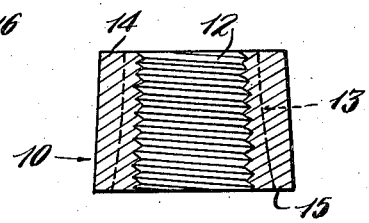
Fig. 5 is a transverse vertical sectional view of the nut taken on line 5—5 of Fig. 1 or Fig. 6, looking in the direction of the arrows.

One way of forming the slots 13 is by the use of a form milling cutter of suitable diameter which can mill successively in each side of the nut a pair of slots simultaneously. The nut and the milling cutter can be positioned relative to each other so that the sweep of the cutter through the nut will mill the slots 13 to the desired depth to produce the sought for wall thickness at the various thread sections. Referring to Fig. 4 the point 16 represents the center of the milling cutter and the lines 17 radii thereof. It will be understood that the teeth of the milling cutter will be of suitable form in outline to produce slots of the desired configuration in the nut. It will be observed that the slots can thus be formed in standard nut blanks in a simple, accurate and economical manner.

From the foregoing it will be evident that the nut after the slots 13 are formed therein will have greater diametral resilience at those transverse sections which bear the lesser part of the normal load than at those sections which assume the greater portion of the normal load. Also those transverse sections of the nut adjacent to the bearing face which bear the greater part of the normal load will have greater radial strength than will those sections adjacent the crown face and which bear the lesser part of the normal load. In other words, each transverse section of the nut has the attributes that enable it to play its proper part in the correct functioning of the nut.

Figure 6:
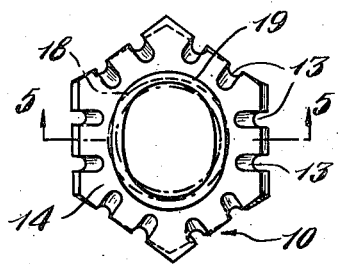
Fig. 6 is a view similar to Fig. 1 but with the diametral distortion of the nut exaggerated.

After the slots 13 have been formed in the nut, the latter is distorted, especially adjacent its crown face, to have a minimum thread pitch diameter substantially less than the thread pitch diameter of the minimum standard bolt to which the nut will be applied, wherefore the nut at those transverse sections of greatest diametral resilience and which bear the lesser part of the normal load will have frictional locking engagement with the bolt threads. In Fig. 6 the distortion of the nut is shown in exaggerated form. It will be understood that the distortion is scarcely discernible to the eye and therefore Fig. 1 of the drawing does not clearly illustrate the same. In Fig. 6 the circular form of the bore 11 of the nut at the crown face is indicated by the dash line 18, while the oval form that this part of the bore has after distortion along a diametral line is indicated by the full line 19. When the nut has been so distorted, it will be seen that the nut adjacent its crown face will have an "interference" or tight fit upon the bolt to which it is applied.

Figure 7:
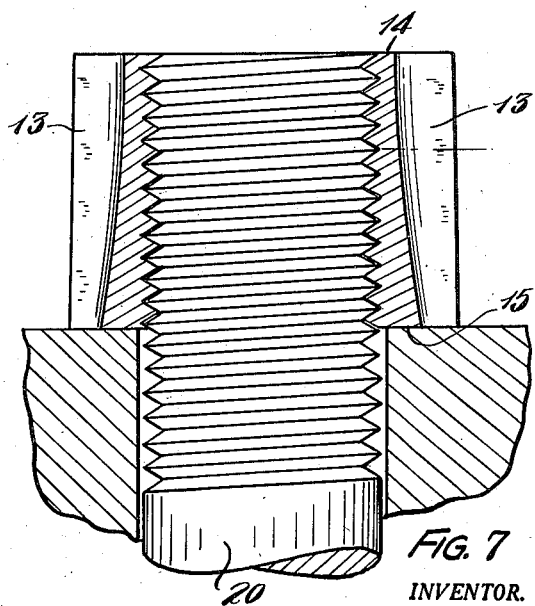
Fig. 7 is a sectional view, on a larger scale, and shows the nut applied to a bolt to the extent that the nut has assumed a portion only of its normal load.

Fig. 7 illustrates, on a larger scale, the manner in which the nut functions when partially applied to a bolt 20. The nut when first applied to the bolt and prior to its assuming sixty percent (60%) of its normal load does not function as does a standard nut. In the present case the threads start to assume the load from the crown face toward the bearing face of the nut and when approximately sixty percent (60%) of the normal load is on the nut all of the threads are bearing approximately equal portions of the load. In Fig. 7 this percentage of the load has not been attained and it will be noted that clearance is shown between the threads of the nut adjacent its bearing face and the threads of the bolt to indicate that said nut threads are not yet bearing any substantial part of the load while the nut threads adjacent the crown face are bearing the major portion of the load. However, after sixty percent (60%) of the normal load has been assumed by the nut, the latter will function similarly to a standard nut, in that the thread convolutions adjacent the bearing face of the nut will assume the greater portion of the remaining forty percent (40%) of the normal load. These thread convolutions are at that part of the nut having the greater radial strength and, hence, are capable of taking their load requirements.

It will be understood that when the nut is applied to the bolt the latter acts to restore the distorted portion of the nut bore from its oval shape toward its original circular shape. Since this portion of the nut has the greatest diametral resilience it will be appreciated that its gripping action on the bolt serves effectively the purpose of a lock nut.

From the foregoing it will be seen that a nut embodying the present invention is a balanced nut in that the various transverse sections of the nut are each capable of meeting its particular requirements in the most efficient and complete manner. The novel and improved nut can be economically formed from standard nut blanks.

It will be obvious that the functioning of such designed nut, in taking the bolt-stress, will also function in reverse order with any reduction of the bolt-stress and tends to compensate, after the manner of a spring washer, for initial losses of bolt tension due to permanent stretch of the bolt or wear of the several surfaces of contact in service.

Although a preferred embodiment of the invention has been illustrated and described it will be understood that the invention is susceptible of various modifications and forms within the scope of the appended claims.

Having thus described my invention, I claim:

1. A nut of the type which is applied to a bolt in the manner of a standard nut with the crown face of the nut adjacent the free end of the bolt and the bearing face of the nut adjacent to the parts secured together by the nut and bolt and comprising a body having a threaded bore and provided with a plurality of peripheral slots extending substantially from the crown face of the nut to the bearing face thereof, said slots decreasing in depth from said crown face toward said bearing face and causing said body to have diminishing radial strength and increasing diametral resilience from said bearing face of the nut toward said crown face thereof.

2. A nut as defined in claim 1 and wherein said body is diametrally distorted to provide adjacent the crown face of the nut a minimum thread pitch diameter less than the minimum thread pitch diameter of any standard bolt with which the nut would be used.

3. A combined holding and locking nut of the type which is applied to a bolt in the manner of a standard nut with the crown face of the nut adjacent the free end of the bolt and the bearing face of the nut adjacent to the parts secured together by the nut and bolt and comprising a standard tapped polygonal nut blank each side of which is provided with a plurality of slots extending from the crown face of the nut to the bearing face thereof and diminishing in depth from said crown face to said bearing face to provide increasing radial strength and decreasing diametral resilience, said blank being distorted to have adjacent the crown face of the nut a minimum thread pitch diameter less than the minimum thread pitch diameter of any standard bolt with which the nut would be used.

4. A nut as defined in claim 3 and wherein the slots in each side of the blank are parallel to each other in the direction of their depth.

5. A combined holding and locking nut of the type which is applied to a bolt in the manner of a standard nut with the crown face of the nut adjacent the free end of the bolt and the bearing face of the nut adjacent to the parts secured together by the nut and bolt and comprising a standard tapped polygonal nut blank of constant cross sectional area from end to end and with the sides of the blank provided with slots extending from the crown face of the nut to the bearing face thereof and diminishing in depth from said crown face to said bearing face to provide increasing radial strength and decreasing diametral resilience.

EDWARD A. GREEN.

REFERENCES CITED

The following references are of record in the file of this patent:

UNITED STATES PATENTS

| Number | Name | Date |
| --- | --- | --- |
| 1,978,229 | Sass et al. | Oct. 23, 1934 |
| 2,125,276 | Green | Aug. 2, 1938 |